United States Patent [19]

Schulson et al.

[11] 4,226,647
[45] Oct. 7, 1980

[54] HEAT-TREATED ZIRCONIUM ALLOY PRODUCT

[75] Inventors: Erland M. Schulson, Deep River; Donald J. Cameron, Pinawa, both of Canada

[73] Assignee: Atomic Energy of Canada Limited, Ottawa, Canada

[21] Appl. No.: 914,829

[22] Filed: Jun. 12, 1978

Related U.S. Application Data

[63] Continuation-in-part of Ser. No. 711,744, Aug. 4, 1976, Pat. No. 4,094,706, which is a continuation-in-part of Ser. No. 465,654, Apr. 30, 1974, abandoned.

[30] Foreign Application Priority Data

May 11, 1973 [CA] Canada .................................. 171070

[51] Int. Cl.² .......................... C21D 1/02; C22D 16/00
[52] U.S. Cl. ..................................... 148/32.5; 75/177; 148/133
[58] Field of Search ........... 148/32, 32.5, 133, 11.5 F, 148/12.3; 75/177

[56] References Cited

U.S. PATENT DOCUMENTS

| | | | |
|---|---|---|---|
| 3,125,446 | 3/1964 | Johnson et al. | 75/177 |
| 4,000,013 | 12/1976 | MacEwen et al. | 148/133 |
| 4,094,706 | 6/1978 | Schulson et al. | 148/32.5 |

FOREIGN PATENT DOCUMENTS

2422578 11/1974 Fed. Rep. of Germany ............. 75/177

Primary Examiner—L. Dewayne Rutledge
Assistant Examiner—Peter K. Skiff
Attorney, Agent, or Firm—W. John McClenahan

[57] ABSTRACT

High tensile strength, creep and corrosion resistant zirconium alloys containing 7.0–10.0 wt % aluminum, 0–3 wt % in total of one or more elements selected from the group consisting of magnesium, tin, chromium, iron, carbon, silicon, yttrium, niobium, molybdenum and beryllium, the balance zirconium and incidental impurities, are produced by annealing cast alloys at a temperature below about 992° C. for a period of time sufficient to produce alloys having a substantially continuous matrix of the ordered intermetallic compound $Zr_3Al$. The alloys may initially be hot worked at temperatures about 1000° C., while in the $\beta Zr$-$Zr_2Al$ two phase region, prior to annealing. Preferred alloys contain 7.5–9.5 wt % aluminum, the balance zirconium and incidental impurities.

14 Claims, 7 Drawing Figures

HEAT-TREATED ZIRCONIUM ALLOY PRODUCT

CROSS-REFERENCE TO RELATED APPLICATION

This application is a continuation-in-part of U.S. Ser. No. 711,744, filed Aug. 4, 1976, now U.S. Pat. No. 4,094,706, which in turn is a continuation-in-part of U.S. Ser. No. 465,654, filed Apr. 30, 1974, now abandoned.

BACKGROUND OF THE INVENTION

This invention relates to the preparation of high strength zirconium alloys containing 7.0–10.0 wt % aluminum.

Structural materials for use in thermal nuclear reactors are required to satisfy a number of requirements, including:

1. Low absorption cross section for thermal neutrons.
2. High corrosion resistance to the gaseous or liquid reactor coolant.
3. Good mechanical strength and ductility.
4. Resistance to creep deformation at elevated temperatures.
5. Resistance to wear and erosion.

Zirconium alloys have been found to satisfy many of these requirements. Commonly employed has been the alloy known under the trade name of Zircaloy-2, and a Zr-2.5%Nb alloy.

Since the earliest days of zirconium technology it has been recognized that alloys based on the $\alpha Zr$ solid solution phase of the Zr-Al system, are superior to any other known group of Zr alloys in respect of their mechanical strength (see A. D. Schwope and N. Chubb Journal of Metals Vol. 4, 1942 page 1138). However, additions of Al of sufficient magnitude to improve the mechanical properties also have the disadvantage that they greatly reduce the corrosion resistance of the alloys, resulting in catastrophic oxidation in steam or water (see R. L. Carpenter, M. D. Carver and E. T. Hayes, U.S. Bureau of Mines Report USBM-U-40 (1955) and M. D. Carver and E. T. Hayes, USBM-U-122 (1956). Because of this difficulty Zr-Al alloys have been disregarded as possible construction materials for use in thermal nuclear reactors.

Zirconium alloys in current use, and many others which have been invented, are based on a matrix of zirconium which contains in solution one or more other elements, and in which matrix there may or may not be precipitates of compounds of zirconium and/or other elements.

The Zr-Al phase diagram was extensively studied by McPherson and Hansen and published in the Transactions of the American Society for Metals, Vol. 46, page 354, 1954. It was found that an intermediate phase, located close to 13% Al, and designated $Zr_2Al$ exists between about 1200° and 1300° C. It is formed by the peritectoid reaction: $\beta Zr + Zr_5Al_3 \rightleftharpoons Zr_2Al$. Another peritectoid reaction was found to occur between 950° C. and 1,000° C. involving the phases: $\beta Zr + Zr_2Al \rightleftharpoons Zr_3Al$ (8.97% Al).

In the course of their work McPherson and Hansen prepared, from high-purity material, 25 gram buttons of Zr-alloys containing 7.0, 7.8, 9.4 and 9.7 wt% aluminum and subjected them to annealing treatments up to about 400 hours at less than approximately 950° C. They determined that the microstructure of the 7.8 wt% Al alloys annealed at these temperatures was substantially that of isolated crystals of $Zr_3Al$ dispersed in a matrix of transformed $\beta Zr$ containing Al in solution, implying that the alloy containing 7.0 wt% Al has a similar structure; the microstructure of the 9.4 and 9.7 wt% Al alloys was a mixture of $Zr_3Al$ and $Zr_2Al$. Subsequently Keeler and Mallery (Transactions of American Inst. of Mining & Metallurgical Engineers, Feb. 1955, Page 394) reported the crystal structure and confirmed the earlier McPherson and Hansen report on the plastic properties of $Zr_3Al$. These workers did not, however, appreciate that Zr-Al alloys having a continuous or substantially continuous matrix of $Zr_3Al$ have significantly different characteristics than Zr-Al alloys having a matrix of $\alpha$ or $\beta$ zirconium. Indeed, from the McPherson and Hansen observation (FIG. 9, p. 360) of crystals of $Zr_3Al$ in a Zr matrix, the knowledgeable metallurgist would have suspected that such alloys would have very low corrosion resistance. No corrosion, tensile or creep properties of the 7.0–9.7 wt% Al alloys were determined due, it is believed, at least in part to the poor corrosion experience previously reported which taught away from the practical use of any Zr-Al alloy with a zirconium matrix. It was not in fact known whether an alloy could be formed having a continuous or substantially continuous matrix of $Zr_3Al$, or if possible, how such an alloy could be formed on a commercial scale.

Considering the McPherson and Hansen paper, page 360, FIGS. 8 and 9 (and captions therefor) and page 361, lines 5–8, it appears that the authors annealed their 7.8 wt% Al alloy to obtain "Predominant phase is $Zr_2Al$ in a matrix of transformed beta". Thus the $Zr_2Al$ would seem to be largely isolated coarse particles of $Zr_2Al$ (see FIG. 8 and its caption). To obtain FIG. 9, the "same alloy" as in FIG. 8 was apparently annealed at 950° C. for 45 hours to give "Crystals of $Zr_3Al$ in a matrix of transformed beta".

From experimentation it has been found that annealing of alloys having coarse particles of $Zr_2Al$ in a $\beta Zr$ matrix, for time periods up to about 160 hours at a temperature of about 950° C., results in transformation of $Zr_2Al$ to $Zr_3Al$ only at the interface surrounding the initial $Zr_2Al$ particles.

The layer of $Zr_3Al$ surrounding the $Zr_2Al$ phase apparently greatly slows the diffusion of Zr and the transformation to $Zr_3Al$ and tends to isolate the $Zr_3Al$ and prevent its forming the continuous matrix phase. It thus becomes clear that casting and initial annealing techniques should be controlled to avoid forming $Zr_2Al$ phase as coarse dispersed particles. In small ingots, coarse $Zr_2Al$ particles were found to inhibit the matrix phase $Zr_3Al$ transformation, and in much larger ingots one could assume still coarser $Zr_2Al$ particles would form and be even more of a problem.

Indeed it might well have been thought that in an ingot of sufficient size to be of practical value, the $Zr_2Al$ particles would be so large that transformation to give a $Zr_3Al$ matrix would be virtually impossible. However, we have shown that by control of ingot diameter and other casting parameters, ingots of 500 pounds can be subsequently transformed to a $Zr_3Al$ matrix in reasonable times. This could certainly not be deduced from the work of McPherson et al, who used very small ingots and high purity material, and had no disclosure of avoiding $Zr_2Al$ coarse particles which prevent obtaining a $Zr_3Al$ matrix phase.

SUMMARY OF THE INVENTION

An object of the present invention is to provide high strength, corrosion resistance zirconium alloys, containing 7.0–10.0 wt% aluminum, which are suitable for thermal nuclear reactor applications. Ternary, quaternary or more additions may be introduced in order to enhance specific properties, within the broad 7.0–10.0 wt% aluminum range. Preferably binary Zr-Al alloys of the present invention will contain 7.5–9.5 wt% Al, and more preferably 7.6–9.0 wt% Al. The alloys of the present invention may also find application in such fields as prosthetic devices and chemical engineering applications.

The alloys of the invention are prepared by annealing a cast, or possibly a powder metallurgically produced, zirconium alloy containing 7.0–10.0 wt%, preferably 7.5–9.5 wt% aluminum, and more preferably 7.6–9.0 wt% aluminum, at a temperature below 992° C. for a sufficient time such that the microstructure of the alloy is transformed to a substantially continuous matrix of the ordered intermetallic phase $Zr_3Al$. To effect homogenization of alloys containing less than 9 wt% Al it is possible to heat soak in the $\beta Zr$ phase field at temperatures between about 1250° and about 1350° C. for times up to a maximum of a few hours, depending on sample size, before transforming to $Zr_3Al$ at temperatures below about 992° C. The intermetallic compound $Zr_3Al$ has an ordered face-centered cubic crystal structure of $Cu_3Au$ type. Therefore alloys in which the matrix is composed of this compound are fundamentally different from other zirconium alloys which have one or both of the close-packed hexagonal and body centered cubic crystal structures of zirconium as their primary phase.

$Zr_3Al$ is considered to be the primary phase in these alloys when it is present in quantities usually greater than about 50% by volume, forming a continuous or semi-continuous network throughout the alloys. The above criteria can be satisfied by alloys containing approximately 6.5 to 10 wt% aluminum. The composition of a single phase $Zr_3Al$ alloy is approximately 8.97% by weight aluminum and in the simple example of a binary zirconium-aluminum alloy.

In one particular aspect the invention provides a heat-treated, high tensile strength creep and corrosion resistant zirconium alloy containing 7.0–10.0 wt% aluminum, and 0–3.0 wt% of one or more elements selected from the group comprising magnesium, tin, chromium, iron, carbon, silicon, yttrium, niobium, molybdenum and beryllium, balance zirconium and incidental impurities, having a substantially continuous matrix of the intermetallic compound $Zr_3Al$.

In another particular aspect the invention provides a corrosion resistant, structural element fabricated from an alloy containing 7.0–10.0 wt% Al, and 0–3.0 wt% of one or more elements selected from the group comprising magnesium, tin, chromium, iron, carbon, silicon, yttrium, niobium, molybdenum and beryllium, balance zirconium and incidental impurities, heat treated in the range from 700° C.–950° C. for a sufficient time to ensure a substantially continuous matrix of the intermetallic compound $Zr_3Al$.

The alloys of the present invention have higher corrosion resistance than dilute Zr-Al alloys while possessing superior mechanical properties to the usual Zr-based alloys, such as Zircaloy-2 and Zr-2.5Nb, currently used in nuclear reactor applications.

The alloys of the present invention also exhibit thermal neutron absorption cross section characteristics of the order of 0.0096 $cm^2/cm^3$, which is well within the designed limits for use in thermal nuclear reactors.

The alloys of the present invention are inherently notch sensitive. However, neutron irradiation ($1.4 \times 10^{24}$ $n/m^2$ ($E > 1$ McV)) appears to suppress notch sensitivity and cause notch strengthening, although long term irradiation results are not yet available.

BRIEF DESCRIPTION OF THE DRAWINGS

The invention will be described in more detail with reference to the following examples and the drawings in which.

DESCRIPTION OF THE PREFERRED EMBODIMENTS

Figure 1:
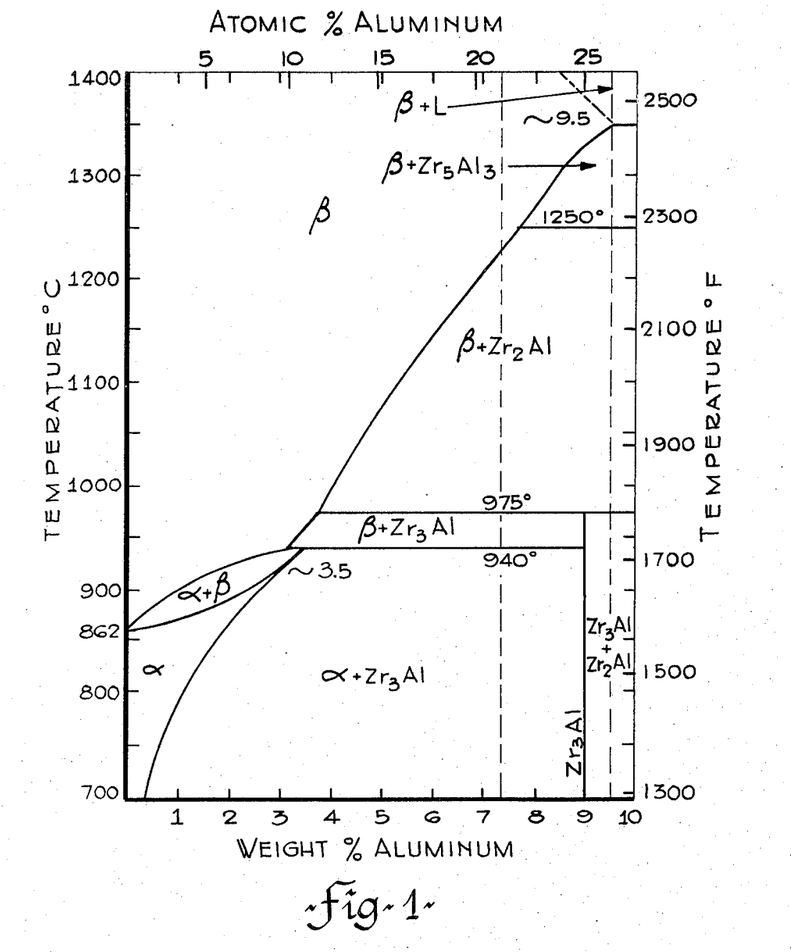
FIG. 1 is a sketch of part of the Zr-Al phase diagram.

Unless otherwise stated, all alloy compositions throughout this specification are defined in percentages by weight. From the phase diagram in FIG. 1 it will be observed that a peritectoid reaction occurs at approximately 975°–992° C. and we have found that cast Zr alloys containing approximately 9 wt% Al will, if held at below about 975° C. for a sufficiently long period of time, eventually undergo a peritectoid transformation and the $\beta Zr$ phase (or $\alpha Zr$ depending on temperature) will react with the $Zr_2Al$ and/or $Zr_5Al_3$ phases resulting in a substantially complete transformation to $Zr_3Al$. Composition on either side of 9 wt% Al will, of course, show varying amounts of $\alpha Zr$ or $Zr_2Al$ depending upon which side of 9 wt% Al they lie. For reasons which will be discussed in more detail hereinafter, the $\alpha Zr$ must be either absent or, if present, distributed in the form of small isolated pools within a $Zr_3Al$ matrix if good corrosion resistance is to be maintained. In order for the $Zr_3Al$ matrix structure to be achieved, we have found it important to control the particle size of the $Zr_2Al$ phase before transformation to avoid coarse dispersed particles of $Zr_2Al$. After transformation the $\alpha Zr$ content must be below 15–20 vol. %, otherwise the corrosion kinetics of the alloy will be determined by the rapidly corroding $\alpha Zr$ phase containing Al in solid solution and not by the slowly corroding $Zr_3Al$ phase. For good corrosion resistance, the binary Zr alloys of this invention shoudl contain at least 7.5 wt% of aluminum. Similarly, but for reasons related to the ductility of the alloys described hereinafter, the $Zr_2Al$ content must be controlled and the binary Zr-Al alloys of the present invention should contain less than about 9.5 wt% aluminum.

EXAMPLE 1—Preparation and Examination of Cast Structures of Alloys of the Present Invention A series of binary Zr-alloys containing from 6.5 wt% Al to about 9.5 wt% Al were prepared by melting together reactor grade zirconium sponge and Al wire (99.6 purity) in vacuum ($10^{-5}$ torr) on a water cooled copper block using an arc melting technique with a non-consumable thoriated tungsten electrode. The alloys were remelted three times and then cast sample buttons weighing approximately 150 grams each were produced.

The cast structures were examined by metallographic, X-ray and electron microprobe techniques, and revealed two phases (a) a transformed $\beta$-zirconium phase containing Al in solid solution and (b) an intermetallic compound $Zr_2Al$. Another intermetallic phase $Zr_5Al_3$ was also present in the form of a core structure within some of the large $Zr_2Al$ regions. In some castings the main phases were distributed as in a eutectic mixture and in others as $Zr_2Al$ regions within a matrix of Zr-Al solid solution. Often both microstructures were present in a single sample. Large ingots (up to 500 lbs.) containing 7.5, 8.6 and 9.0 wt% Al were also produced by arc melting. The structure was similar to that of the small castings: the main difference was the larger "diameter" of the $Zr_2Al$ particles, see Table 1.

TABLE 1

| Ingot Size | | Composition | $Zr_2Al$ width seen on Metallurgical Sections | $Zr_2Al$ Content |
|---|---|---|---|---|
| Dia. (cm) | Wt. (kg) | (wt. % Al) | ($\mu$m) | (vol. %) |
| 1.3 | 0.15 | 8.6 ± 0.1 | 1–1.5 | 55 |
| 15 | 50 | 8.6 ± 0.1 | 3–4 | 55 |
| 23 | 225 | 8.6 ± 0.1 | 8–10 | 55 |

Effect of ingot size on the size of $Zr_2Al$ particles in Zr 8.6 wt. % Al ingots prepared by arc-melting reactor grade sponges zirconium and commercial purity aluminum.

EXAMPLE 2—Heat Treatment to Effect Transformation; Effect of Condition of $Zr_2Al$ phase on Transformation 150 Gram samples of cast alloys produced in Example 1 were annealed under vacuum at 1200° C. in the $\beta + Zr_2Al$ region for 12 hours and then annealed at 950° C. under vacuum for times up to 160 hours. The samples were then examined by X-ray, electron microprobe and metallographic techniques and it was found the transformed structures consisted mainly of coarse particles of $Zr_2Al$ within a matrix of Zr-Al solid solution; a small amount of $Zr_3Al$ was present in the form of a narrow rim around the $Zr_2Al$ particles, thus confirming the peritectoid formation of $Zr_3Al$. The corrosion resistance (e.g. in moist air at 300° C.) of these samples was poor, illustrating the desirability of producing a continuous $Zr_3Al$ phase in the alloys. However, when alloys are first heat treated in the $\beta Zr$ solid solution region at temperatures well above 1200° C., depending on composition, and are then heat treated below 975° C., the required $Zr_3Al$ matrix structure is produced quickly and these alloys have good corrosion properties. This example also serves to show that the heat treatment technique to be employed is critical and cannot be merely deduced from the phase diagram of the system.

EXAMPLE 3—Transformation to $Zr_3Al$ Matrix Structure

Samples of cast alloys produced as in Example 1 were annealed at temperatures in the range 700°–975° C., preferably at about 900° C. for times up to 380 hours, usually about 100 hours or less being satisfactory. The required annealing time depended upon the temperature, the coarseness of the as-cast structure and the desired grain size of the final product. All annealing was effected in vacuum to avoid disintegration of the castings due to rapid oxidation at temperatures above 700° C. Subsequent examination by X-ray, electron microprobe and metallorgraphic techniques revealed that the transformed structures of the alloys consisted essentially of a $Zr_3Al$ matrix plus very small amounts of residual $Zr_5Al_3$; $\alpha Zr$ and $Zr_2Al$ were also present, the amounts depending on the exact composition of the alloy. FIGS. 2a–2h illustrate the microstructures of transformed alloys, at a magnification of ×500, assaying:

(a) 6.5 wt% Al
(b) 7.0 wt% Al
(c) 8.0 wt% Al
(d) 8.8 wt% Al
(e) 9.0 wt% Al
(f) 9.3 wt% Al
(g) 9.4 wt% Al
(h) 9.5 wt% Al balance Zr respectively. The alloys of FIGS. 2a–2d were transformed at 900° C. for 50 hours. hot worked at about 1050° C. and then annealed at 900%C. for about 1 to 2 hours; the alloys of FIGS. 2e–2h were transformed at 900° C. for 168 hours, hot worked at about 1050° C. and then annealed at 900° C. for about 2 hours.

Table 2 below summarizes the alloy composition and phase content of these particular alloys. The amount of each phase present in any composition is determined, to some extent, by the time and temperature of heat treatment. For example some 8.8 wt% Al alloys have been prepared which contain as little as 10% $Zr_2Al$, and some 8.95 wt% Al alloys have recently been prepared which contain less than 1% $\alpha Zr$ and no $Zr_2Al$.

TABLE 2

| Alloys Composition (wt. % Al) | Alloy Composition and Phase Content | | | |
|---|---|---|---|---|
| | Phase Content (%) | | | |
| | $Zr_3Al$ | $\alpha Zr$ | $Zr_2Al$ | $Zr_5Al_3$ |
| 6.5 | 65 | 35 | — | — |
| 7.0 | 80 | 20 | — | — |
| 8.0 | 80 | 10 | 10 | — |
| 8.8 | 65 | 12 | 23 | — |
| 9.0 | 65 | 8 | 27 | — |
| 9.3 | 55 | 16 | 29 | — |
| 9.4 | 45 | 10 | 44 | 0.4 |
| 9.5 | 45 | 10 | 45 | — |

Figure 2:
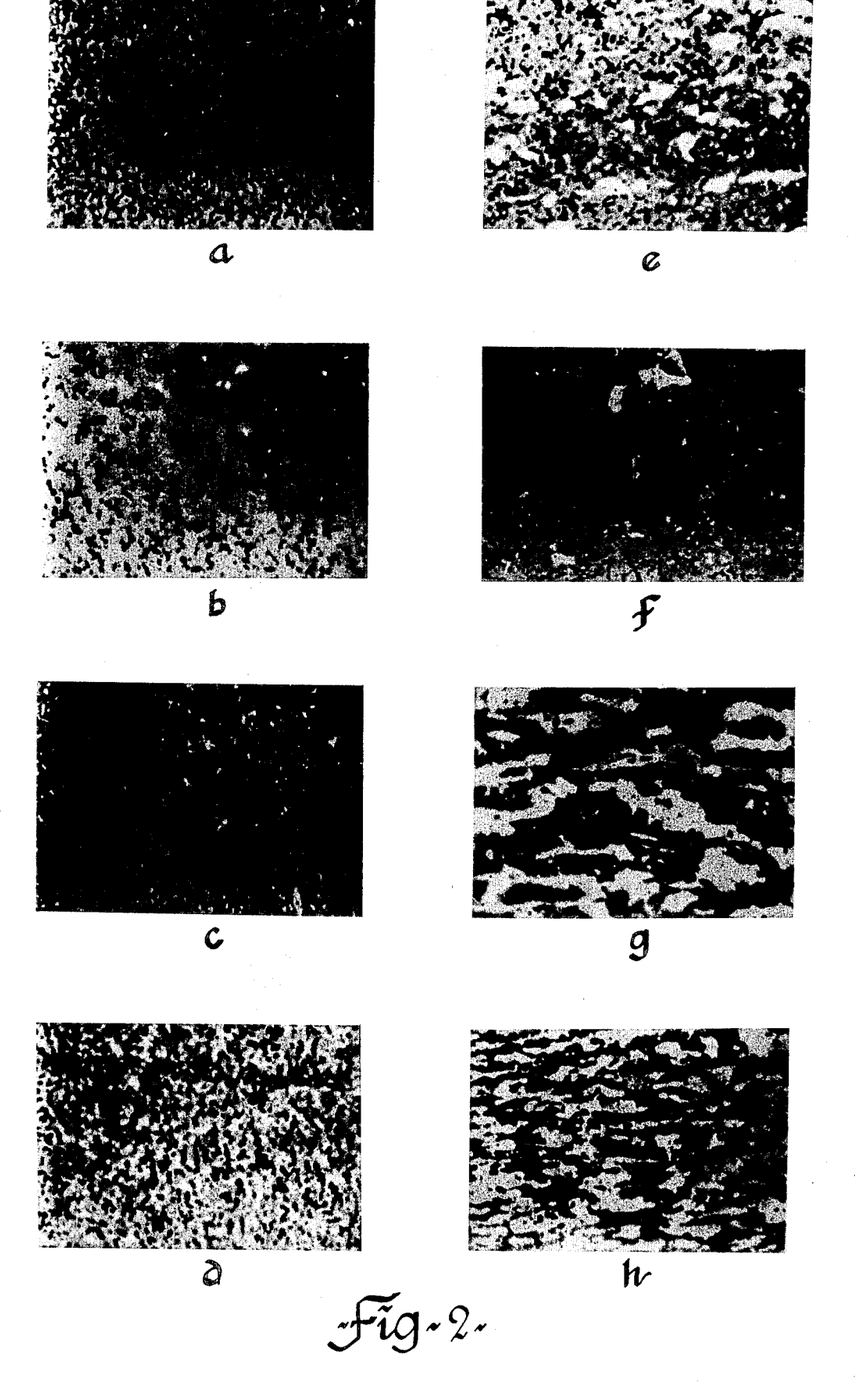
FIGS. 2a–2h are photomicrographs of $Zr_3Al$ alloys containing (a) 6.5 wt% Al; (b) 7.0 wt% Al; (c) 8.0 wt% Al; (d) 8.8 wt% Al; (e) 9.0 wt% al; (f) 9.3 wt% Al; (g) 9.4 wt% Al; (h) 9.5 wt% Al; balance Zr respectively.

In FIG. 2a, illustrating an alloy containing 6.5 wt% Al, $\alpha Zr$ is present as an interconnected network within the $Zr_3Al$ matrix, whereas in FIGS. 2b–2h illustrative of alloys with higher Al contents, $\alpha Zr$ is only present in the form of small, isolated pools within the $Zr_3Al$ matrix. Metallographic examination of oxidized alloys containing 6.5 wt% Al revealed network corrosion of the $\alpha Zr$ phase. For good corrosion resistance, therefore, it is clear that the $\alpha Zr$ content must be kept below 15–20 vol. % so that the $\alpha Zr$ regions are isolated. This effectively limits the Al content to be greater than about 7.5 wt %.

Samples of Zr alloys containing 8.8 wt% Al were heat soaked at 1285° C. for 21 hours so as to produce a microstructure containing βZr and Zr₅Al₃, two of the phases present in the cast alloys. These samples were then transformed into Zr₃Al at temperatures between 825° C. and 925° C. The results of these experiments showed that a large fraction of the matrix transformed to Zr₃Al in times less than 10 hours; also the results indicated that the rate of transformation at 875° C. was higher than that at 925° C. and at 825° C.

EXAMPLE 4—Optimization of the Transformation to Zr₃Al

Using the alloys listed in Table 1, detailed studies have been made of the peritectoid transformation kinetics as a function of transformation temperature, particle size and impurity content. The results revealed the following:

(i) In ingots containing small Zr₂Al particles, i.e. particles of diameter below ≃4 μm, the transformation velocity reached a maximum at about 887° C. This occurred because the transformation velocity becomes nucleation controlled the finer are the Zr₂Al particles. In ingots containing large Zr₂Al particles, i.e. particles exceeding 8 to 10 μm in diameter, the velocity increased with increasing temperature, so that the transformation at 925° C. was faster than that at about 887° C. This occurred because with larger particles the transformation velocity is controlled by long range atomic diffusion.

(ii) In 50 kg ingots containing ∼4 μm diameter Zr₂Al particles (i.e. ingots of a size suitable for commercial pressuretube fabrication for thermal-nuclear power reactors of the CANDU-type), the transformation velocity was retarded and the amount of Zr₃Al produced in an alloy of given aluminum content was reduced through the additions of Nitrogen. For instance, 1600 ppM N (by weight) in a Zr-8.6 wt% Al alloy lowered the equilibrium peritectoid temperature to the extent that the initial transformation velocity at 875° C. was reduced by a factor of 4 and the equilibrium amount of Zr₃Al was reduced from about 90% to about 60%. These observations show that nitrogen levels must be kept small to allow the transformation to proceed to completion in reasonable times.

(iii) Annealing longer than necessary to effect the transformation is to be avoided because this has been observed to result in larger Zr₃Al grains and, hence, lower yield strength. For an alloy containing 4 μm diameter Zr₂Al particles, 8 to 16 hours at about 880°–900° C. preferably 887° C. is the optimum time and temperature.

EXAMPLE 5—Working of Alloys by Rolling

Cast alloys produced in Example 1 were hot rolled at temperatures up to about 900° C. Cracks formed even after only small reductions in thickness.

Alloys, produced as in Example 1 and heat treated as in Example 3 were heat soaked at 600° C. to 975° C. for a few minutes and were then rolled at temperatures in the range 600°–975° C. It was found that cracking may occur in irregularly shaped specimens and if the initial reduction per pass is too large. To prevent cracking on rolling, therefore, it is preferred to use rectangular shape and to keep the initial reductions below about 1–2%.

EXAMPLE 6—Measurement of Tensile Strength of Alloys of the Invention

Alloys produced as described in Example 1 and transformed as described in Example 3 were hot worked as described in Example 5 but at higher temperatures i.e. above 1000° C. A final transformation anneal in vacuum at 900° C. for 45 minutes, was carried out to give the desired structure. The microstructures are shown in FIGS. 2a–2h.

Transmission electron microscopy revealed that in this condition the Zr₃Al phase was well ordered and the grain size was rather small (1–2 μm in diameter). Samples were then tensile tested at temperatures from 20° C. to 600° C. The results are summarized in Table 3a.

Other alloys were also transformed as in Example 3 but for 120 hours at 900° C. and then tensile tested at temperatures from 20° C. to 700° C., without intermediate hot working. The tensile properties of these alloys are shown in Table 3b. The yield points of alloys with compositions between 8.5 and 9.5 wt% Al are somewhat lower than those of alloys which have been hot worked because their grain size was larger due to the longer transformation anneal.

These results indicate that the mechanical properties of the material can be controlled within certain limits by control of the temperature and time of the transformation heat treatment. The transformation heat treatment should be performed in the range about 500°–975° C.

TABLE 3a

Flow Parameters at 20° C., at ∼300° C., at ∼450° C. and at ∼600° C.
for Several Zr₃Al-Based Ordered Alloys Transformed
45 Minutes at 900° C.
(Strain rate - 4.5 × 10⁻⁴/sec)

| Alloy (wt. % Al) | Test Temp. (°C.) | Yield Stress 0.2% at Strain Offset (psi) | Ultimate Tensile Stress (psi) | Total Elongation (%) |
|---|---|---|---|---|
| 6.5 | 20 | 112,000 | 148,000 | 26.7 |
| 6.5 | " | 114,000 | — | — |
| 8.8 | " | 116,000 | 132,000 | 4.0 |
| 9.0 | " | 109,000 | 111,000 | <.3 |
| 9.3 | " | 135,000 | 133,000 | 1.2 |
| 9.4 | " | 122,000 | 125,000 | <.3 |
| 9.5 | " | 126,000 | 131,000 | <.3 |
| 6.5 | 350 | 100,000 | 124,000 | 30.6 |
| 7.0 | 300 | 86,000 | 150,000 | 29.2 |
| 7.0 | 300 | 88,000 | 149,000 | 29.2 |
| 8.0 | 300 | 106,000 | 160,000 | 29.2 |
| 8.0 | 300 | 110,000 | 165,000 | 26.2 |
| 8.8 | 310 | 108,000 | 145,000 | 19.4 |
| 9.0 | 320 | 103,000 | 133,000 | 10.0 |
| 9.3 | 335 | 116,000 | 127,000 | 9.1 |
| 9.5 | 305 | 114,000 | 132,000 | 10.4 |
| 6.5 | 465 | 84,000 | 112,000 | 26.0 |
| 8.8 | 465 | 106,000 | 118,000 | 14.7 |
| 9.3 | 460 | 105,000 | 113,000 | 9.2 |
| 9.4 | 455 | 103,000 | 117,000 | 8.5 |
| 9.5 | 450 | 117,000 | 132,000 | 10.0 |
| 6.5 | 600 | 48,000 | 70,000 | 8.0 |
| 8.8 | 605 | 90,000 | 94,000 | 21.7 |
| 9.0 | 600 | 85,000 | 93,000 | 13.3 |
| 9.3 | 625 | 81,000 | 89,000 | 5.0 |
| 9.4 | 605 | 87,000 | 100,000 | 9.0 |

TABLE 3b

Flow Parameters between 20° C. and 700° C. for Several Zr₃Al Based Ordered Alloys Transformed 120 Hours at 900° C. (Strain rate = $1.7 \times 10^{-4}$/sec.)

| Alloy (wt % Al) | Test Temp. (°C.) | Yield Stress at 0.2% Strain Offset (psi) | Ultimate Tensile Stress (psi) | Total Elongation (%) |
|---|---|---|---|---|
| 6.9 | 20 | 105,000 | 149,000 | 10 |
| " | 180 | 97,000 | 150,000 | 25 |
| " | 300 | 88,000 | 132,000 | 29 |
| " | 400 | 89,000 | 127,000 | 31 |
| " | 500 | 73,000 | 102,000 | 34 |
| " | 600 | 65,000 | — | >100 |
| " | 700 | 31,000 | 39,000 | 28 |
| 7.8 | 20 | 92,000 | 124,000 | 5 |
| " | 110 | 92,000 | 130,900 | 9 |
| " | 200 | 90,000 | 171,000 | 33 |
| " | 300 | 96,000 | 162,000 | 38 |
| " | 400 | 93,000 | 144,000 | 40 |
| " | 500 | 88,000 | 118,000 | 50 |
| " | 600 | 72,000 | 75,000 | 31 |
| " | 700 | 48,000 | — | >100 |
| 8.5 | 400 | 60,000 | 112,000 | 25 |
| " | 600 | 63,000 | 86,000 | 50 |
| 9.0 | 400 | 63,000 | 148,000 | 23 |
| " | 600 | 63,000 | 89,000 | 42 |
| 9.5 | 400 | 66,000 | 99,000 | 13 |

Compared with conventional solution and precipation strengthened Zr alloys used commercially, as shown in Table 4, the Zr₃Al based alloys of the present invention generally show higher ultimate tensile strengths.

TABLE 4

(From P.A. Ross-Ross & C.E.L. Hunt Journal of Nuclear Materials 26 1968, 2-17)

| Alloy | Condition | Yield Stress at 0.2% Strain Offset (psi) at 300° C. | Ultimate Tensile Stress (psi at 300° C. | Total Elongation (%) at 300° C. |
|---|---|---|---|---|
| Zircaloy 2 | Cold Worked (18%) | 45,000 | 52,000 | 26 |
| Zr-2.5Nb | Worked (22%) | 53,000 | 76,000 | 15 |

For instance the highest ultimate tensile stress (U.T.S.) at 300° C. for Zr₃Al based alloys is >160,000 psi, while the highest U.T.S. at 300° C. for commercial Zr alloys is >150,000 psi. Furthermore the Zr₃Al based alloys retain their strength to higher temperatures.

EXAMPLE 7—Ductility of Zr₃Al Based Alloys

Figure 3:
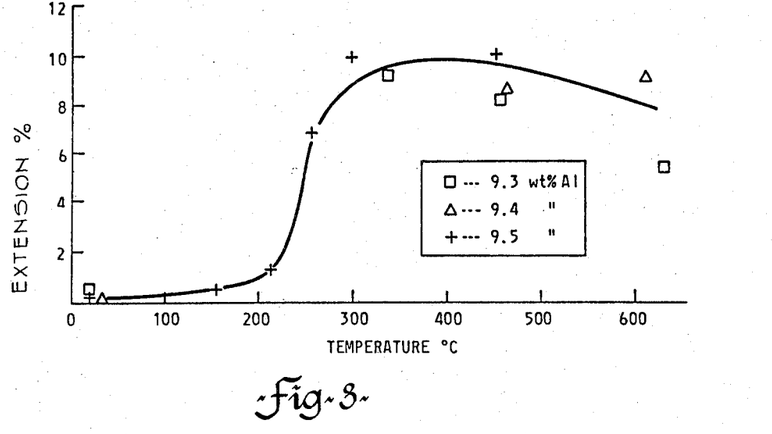
FIG. 3 is a graph showing transition temperature of brittle-ductile fracture of zirconium alloys containing 9.3 to 9.5 wt% Al.

Generally, the Zr₃Al based alloys produced and transformed as described above in Examples 1, 3 and 5 show significant ductility. However, the hyperstoichiometric 9.0–9.5 wt% Al alloys of the structures described here and tested at a strain rate of $4.5 \times 10^{-4}$ per sec, become ductile only above about 250° C.±50° C., and even then tend to show strain to fracture less than that of the hypostoichiometric alloys. FIG. 3 shows the brittle to ductile transition in these hyperstoichiometric alloys. It is believed this transition is due to the presence of a second intermetallic phase Zr₂Al, distributed throughout the Zr₃Al matrix. As the amount of Zr₂Al increases, for instance from about 23 vol. % in the 8.8 wt% Al alloy to about 45 vol. % in the 9.5 wt% Al alloy, the room temperature ductility decreases from about 4% to 0.3%. Thus the presence of Zr₂Al limits the Al content in the alloys of the present invention to less than about 9.5 wt % for good ductility. It can be seen by the comparison of the ductility data in Tables 3a and 3b that the alloys with longer transformation times in general display greater elongations to failure than similar alloys which have been subjected to only a short heat treatment.

EXAMPLE 8—Creep strength at Elevated Temperatures of Alloys of the Present Invention.

In-laboratory tensile creep experiments on a 9.5 wt % Al alloy (prepared as described in Examples 3 and 5) were performed over a range of temperatures from 300° C. to 500° C. and under a range of tensile stresses from 20,000 psi to 75,000 psi. After a period of primary creep, the percent elongation versus time relationship became reasonably linear. The creep rates were then computed from the slopes of the linear segments of the strain-elongation curves. Table 5a summarizes the results.

Figure 4:
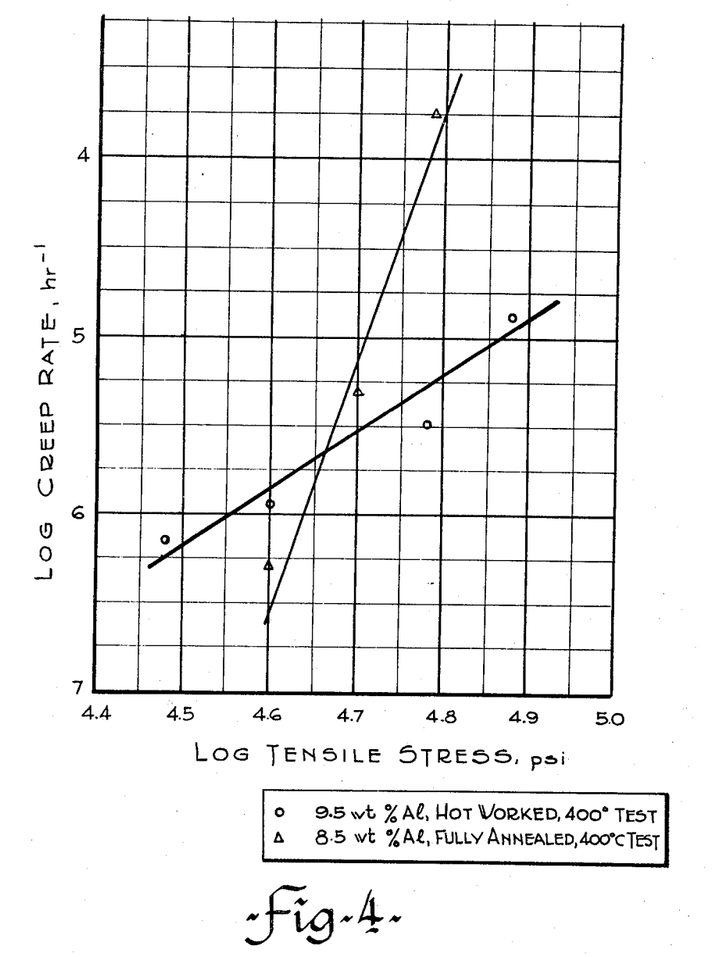
FIG. 4 is a graph, on a log-log scale, showing the relationship between creep rate and tensil stress for selected zirconium alloys in the hot worked and fully annealed conditions.

Creep tests have also been performed on other alloys, transformed as in Example 3 by a single stage heat treatment at 900° C. for 120 hrs. The results are reported in Table 5b. Of particular interest are the data determined on the 8.5 wt% alloy at 60,000 to 40,000 psi and 400° C. These data are compared with the 400° C. results for the 9.5 wt% Al alloy in FIG. 4. It can be seen that below 43,000 psi the alloy with the longer heat treatment has superior creep properties, while above this stress the merits of the alloys are reversed. This again indicates the importance of the degree of annealing of the alloys in determining their mechanical properties, although as the alloys do have different compositions this could also be a contributing factor.

At 300° C., the creep rate at a given stress for the Zr₃Al-based alloy is lower by a factor of 2 or 3 than that for a Zr-2.5 wt% Nb alloy and for Zircaloy-2, two materials currently used for structural components in "CANDU" thermal nuclear reactors. At higher temperatures (i.e., 400° C. to 500° C.), the results indicate that the creep rate at a given stress for the Zr₃Al-based alloys is lower by a factor of 10 or more.

TABLE 5a

Tensile Creep Rates for a Hot Worked Zr-9.5 wt. % Al Alloy

| Test Temp. (°C.) | Tensile Stress (psi) | Creep Rate (hour−1) |
|---|---|---|
| 300 | 30,000 | $1.0 \times 10^{-7}$ |
|  | 60,000 | $1.0 \times 10^{-6}$ |
| 400 | 30,000 | $7.7 \times 10^{-7}$ |
|  | 45,000 | $1.1 \times 10^{-6}$ |
|  | 60,000 | $3.3 \times 10^{-6}$ |
|  | 75,000 | $1.3 \times 10^{-5}$ |
| 500 | 30,000 | $8.5 \times 10^{-6}$ |
|  | 45,000 | $4.2 \times 10^{-5}$ |
|  | 60,000 | $6.0 \times 10^{-5}$ |
|  | 30,000 | $4.3 \times 10^{-6}$ |
|  | 20,000 | $2.1 \times 10^{-6}$ |

TABLE 5b

Tensile Creep Rates for Fully Annealed Zr₃Al-Based Alloys

| Composition, wt. % Al | Stress, psi | Temperature, °C. | Creep Rate hr−1 |
|---|---|---|---|
| Zr-6.8% Al | 10,000 | 650 | $1.6 \times 10^{-3}$ |
| Zr-6.8% Al | 10,000 | 600 | $1.2 \times 10^{-4}$ |
| Zr-7.8% Al | 10,000 | 650 | $5.9 \times 10^{-4}$ |
| Zr-7.8% Al | 10,000 | 600 | $1.2 \times 10^{-4}$ |
| Zr-7.8% Al | 10,000 | 550 | $1.4 \times 10^{-5}$ |
| Zr-7.8% Al | 15,000 | 500 | $4.0 \times 10^{-6}$ |
| Zr-8.5% Al | 60,000 | 400 | $1.8 \times 10^{-4}$ |
| Zr-8.5% Al | 50,000 | 400 | $4.8 \times 10^{-6}$ |
| Zr-8.5% Al | 40,000 | 400 | $5.8 \times 10^{-7}$ |

TABLE 5b-continued

| Tensile Creep Rates for Fully Annealed Zr$_3$Al-Based Alloys | | | |
|---|---|---|---|
| Composition, wt. % Al | Stress, psi | Temperature, °C. | Creep Rate hr$^{-1}$ |
| Zr-8.8% Al | 10,000 | 640 | $9.3 \times 10^{-6}$ |
| Zr-9.1% Al | 10,000 | 640 | $1.0 \times 10^{-5}$ |
| Zr-9.3% Al | 10,000 | 640 | $1.4 \times 10^{-5}$ |
| Zr-2.5% Nb | 20,000 | 450 | $5 \times 10^{-5}$ |
| Zircaloy-2 | 20,000 | 450 | $8 \times 10^{-5}$ |

EXAMPLE 9—Creep Strength in an Irradiation Field

To obtain a relative measure of the creep strength of Zr$_3$Al-based alloys in a field of fast neutrons, four specimens of the 9.5 wt% Al alloy, prepared as in Examples 3 and 5, were subjected to a bent-beam type stress-relaxation test in a thermal nuclear reactor. The test period was 1543 hours; the test conditions were 295° C.±5° C. water environment, ≃33,500 psi maximum stress, and a fast flux (E>1 Mev) of $1.6 \times 10^{13}$ neutrons/cm$^2$/sec. The unrelaxed stress ratios $\sigma/\sigma_o$, were found to be 0.814 and 0.503 for annealed and for hot-worked specimens, respectively, and the reproducibility was very good. This again indicates the importance of the degree of annealing in controlling the properties of the alloys.

To obtain some very short-term data, experiments under similar conditions of temperature and stress were performed out-reactor in an autoclave. As is the case for conventional zirconium-based alloys, it is assumed that very short-term auto-clave experiments give a reasonable indication of the early stages of the in-reactor stress relaxation behaviour of the Zr$_3$Al-based alloys. From these experiments, the ratios $\sigma/\sigma_o$ were found to be 0.945, 0.972 and 0.905 after test periods of 30 hours, 130 hours, and 500 hours, respectively.

In keeping with common practice of analyzing stress-relaxation data, the results from the in-reactor and from the out-reactor experiments were plotted in terms of the logarithm of the unrelaxed stress ratio, ln $\sigma/\sigma_o$, versus the relaxation time. From the slope of this plot, the stress-relaxation parameter A·E (where A is a "material constant" which takes into account the conditions under which the experiments were performed, and E is Young's modulus which was found to be $\sim 18.3 \times 10^6$ psi (example 10)) was found to be less than $1.0 \times 10^{-4}$ per hour for the annealed material.

Table 6 compares this result with that from experiments by D. E. Fraser, P. A. Ross-Ross and A. R. Causey (J. Nuclear Materials, Vol. 46 1973 in press) on Zr-2.5 wt.% Nb and on Zircaloy-2, two alloys presently used for structural components in 'CANDU' thermal nuclear reactors. (An adjustment is made for the 25% higher flux in the Zr-2.5 wt.% Nb and in the Zircaloy-2 alloys.) Clearly, the "material constant" A for the present alloy in the annealed condition is lower than that for the other alloys. This result indicates that the in-reactor creep rate for the Zr$_3$Al-based alloy is lower than that for the Zr-2.5 wt.% Nb and the Zircaloy-2 alloys.

Table 6

| Values of the Stress-Relaxation Parameters A·E and A for an Annealed Zr-9.5 wt. % Al Alloy and for a Zr-2.5 wt. % Nb Alloy and for Zircaloy-2 at 295 ± 5° C. and Under a Neutron Flux (E > 1 Mev) of $1.6 \times 10^{-}$n/cm$^2$/sec | | | |
|---|---|---|---|
| Material | Test Period (hours) | A·E $\times 10^4$ (hours$^{-1}$) | A $\times 10^{12}$ (psi$^{-1}$ hour$^{-1}$) |
| Zr-9.5 wt. % Al | 1543 | $\leq 1.0$ | $\leq 6.6$ |
| Zr-2.5 wt. % Nb | 8200 | 1.3 | 12 |
| Zircaloy-2 | 8200 | 2.0 | 19 |

EXAMPLE 10—Elastic Constants (Young's Modulus)

Specimens of 8.8, 9.0, 9.2 and 9.5 wt% Al alloys, prepared as in Examples 3 and 5, were compressed under a static load at room temperature. The corresponding reductions in specimen length (Δl) were monitored using calibrated strain gauges attached to the specimens. From a knowledge of the initial lengths of the specimens and Δl, the strains were computed; and from a knowledge of the static loads and the cross-sectioned areas of the specimens, the applied stresses were computed. Young's moduli were then computed by dividing the applied stresses by the measured strains, and were found to be $\sim 18.3 \times 10^6$ psi. No significant effect of composition was apparent. This compares with a value of $\sim 13 \times 10^6$ psi at 20° C. for conventionally strengthened Zr alloys.

EXAMPLE 11—Corrosion Resistance

Zr$_3$Al-based alloys, cast, transformed in the single-stage process, as described in Example 3, and worked as in Example 5 were subsequently annealed in vacuum at 900° C. for 45 min. Corrosion coupons were then prepared and tests were carried out in moist air. Zircaloy-2 specimens were included for comparison.

Table 7a summarizes the results after 30 days at 300° C. in moist air. Clearly, the near-stoichiometric compositions (i.e. $\sim 8.0-\sim 9.5$ wt.% Al) have considerably better corrosion resistance than alloys of lower Al content. Also, the results suggest that alloys closer to the stoichiometric composition should have corrosion resistance comparable to that for Zircaloy-2, at least in the present environment.

Table 7a

| Oxidation Parameters at 300° C. (Moist Air) for Several Zr$_3$Al-Based Alloys | | | |
|---|---|---|---|
| Alloy (wt. % Al) | Vol. % Zr-Al Solid Soln. | Total wt. gain/ unit area after 30 days (mg/dm$^2$) | Rate of wt. gain/ unit area (mg/dm$^2$-day) |
| 6.5 | 35 | 510 | 20.4 |
| 7.0 | ~10 | 19 | 0.34 |
| 8.0 | ~9 | 5 | <0.1 |
| 9.5 | ~9 | 11 | 0.21 |
| Zircaloy-2 (Batch Bh) | — | 8.5 | 0.13 |

Table 7b summarizes the results after 30 days at 400° C. in 1 atm. steam, in comparison to a commercial Zircaloy-2 alloy and to a dilute Zr-Al alloy which is based on the α Zr phase.

Table 7b

| Alloy (wt. % Al) | wt. gain after 30 days (mg/dm$^2$) | Rate of wt. gain/unit area (mg/dm$^2$-day) |
|---|---|---|
| Zr-8.0 Al | 29.6 | 0.55 |
| Zircaloy-2 (Bh-Batch) | 30.0 | 0.55 |

Table 7b-continued

| Alloy (wt. % Al) | wt. gain after 30 days (mg/dm$^2$) | Rate of wt. gain/unit area (mg/dm$^2$-day) |
|---|---|---|
| Zr-1.0 Al | alloy disintegrated after two days exposure | 600 |

EXAMPLE 12—Short Term Corrosion Resistance in Pressurized Water

The alloys given in example 11 were also subjected to some short term corrosion tests in pressurized water (~1300 psi) at 300° C. After 49 days, alloys near 8.0 wt.% Al continued to show interference colors indicating a very thin oxide film, while the Zircaloy-2 control specimens appeared black indicating a thicker oxide film. This again illustrates the considerable improvement to be realized in the corrosion-resistance of the Zr-Al system by designing alloys based on the Zr$_3$Al compound.

EXAMPLE 13—Corrosion Resistance in an Irradiation Field

A Zr alloy containing 9.5 wt.% Al was subjected to a bent-beam type stress-relaxation experiment in a thermal nuclear reactor (see Example 9). The test environment was pressurized water (~1300 psi) at 295°±5° C. and the test period was 1543 hours; the neutron flux (E>1 MeV) was $1.6 \times 10^{13}$ neutrons/cm$^2$/sec. On completion of the test, it was found that the oxide films which formed during the exposure could not be loosened on vigorous scraping against metal tweezers, indicating considerable film adherence to the underlaying Zr$_3$Al-based substrate. Subsequent metallographic examination revealed that the film thickness varied from ~1 micron to ~8 microns.

These observations again illustrate the improvement to be gained in the corrosion-resistance of Zr-Al alloys by designing alloys based on the Zr$_3$Al intermetallic compound.

EXAMPLE 14—Resistance of Alloys of the Present Invention to Corrosion by Carbon Dioxide Zr 8.7 wt% Al and Zr-9.4 wt% Al alloys of the present invention, prepared as in Example 3, were exposed to flowing commercial purity carbon dioxide for prolonged periods at a temperature of 400° C. Carbon dioxide is used as a coolant in some reactors and as the surrounding medium for the coolant channels in others. For these reasons resistance to corrosion by $CO_2$ is an important property of Zr alloys for nuclear reactor applications.

In addition to the Zr$_3$Al-based alloys, samples of Zr-2.5 wt% Nb and zircaloy-2 were exposed in the same tests under identical conditions. The gain in weight for each alloy, which is a measure of the extent of corrosion, is recorded for various times of exposure in Table 8 below.

The data show that the alloys have a corrosion resistance considerably better than Zr-2.5 wt% Nb, and have corrosion rates comparable to Zircaloy-2.

Table 8

| The Corrosion of Zr$_3$Al-Based Alloys in $CO_2$ at 400° C. | | | | | |
|---|---|---|---|---|---|
| Composition wt. % | Weight Gain, mg/dm$^2$, After | | | | |
| | 5 Days | 10 Days | 20 Days | 40 Days | 60 Days |
| Zr-8.7% Al | 6 | 11 | 18 | 24 | 30 |
| Zr-9.4% Al | 9 | 14 | 19 | 26 | 34 |
| Zr-2.5% Nb | 18 | 32 | 52 | 77 | 95 |
| Zircaloy-2 | 11 | 17 | 23 | 27 | 33 |

The major impurities in the $CO_2$ are: $O_2$=100 to 170 ppm, $H_2O$=20 ppm, $H_2$=<20 to 30 ppm.

EXAMPLE 15—Hardness of Alloys of the Present Invention

The damage to fuel cans and coolant channels by wear due to vibrations in nuclear reactors is of considerable concern. In general the resistance of a material to wear may be approximately related to the hardness of the material. Alloys which are based on Zr$_3$Al have considerably higher hardness, and consequently expected resistance to wear, than the conventional zirconium alloys, Zr-2.5 wt% Nb and Zircaloy-2. The Diamond Pyramid Hardness of alloys of a range of compositions, prepared as in Example 3, has been measured at various temperatures in an atmosphere of purified argon. The measurements are recorded in Table The same measurements were performed on samples of Zr-2.5 wt% Nb and Zircaloy-2, and are included for comparison. It is apparent that all of the alloys based on Zr$_3$Al have considerably higher hardness values than two conventional alloys, and therefore are an improvement over existing alloys in this respect.

Table 9

| The Hardness of Alloys Based on Zr$_3$Al | | | | | |
|---|---|---|---|---|---|
| Composition wt % | Heat-Treatment | Diamond Pyramid Hardness Kg/mm$^2$ | | | |
| | | 100° C. | 300° C. | 500° C. | 700° C. |
| Zr-6.8% Al | 380 hrs at 900° C. | 260 | 191 | 132 | 64 |
| Zr-7.8% Al | 380 hrs at 900° C. | 258 | 201 | 149 | 104 |
| Zr-8.6% Al | 380 hrs at 900° C. | 307 | 232 | 170 | 113 |
| Zr-8.7% Al | 380 hrs at 900° C. | 391 | 317 | 224 | 100 |
| Zr-8.9% Al | 380 hrs at 900° C. | 380 | 310 | 215 | 72 |
| Zr-9.1% Al | 380 hrs at 900° C. | 402 | 332 | 228 | 100 |
| Zr-9.2% Al | 380 hrs at 900° C. | 428 | 323 | 210 | 65 |
| Zr-9.5% Al | 380 hrs at 900° C. | 356 | 273 | 203 | 106 |
| Zr-9.7% Al | 380 hrs at 900° C. | 292 | 201 | 150 | 84 |
| Zr-2.5% Nb | 1 hr at 500° C. | 186 | 92 | 58 | — |
| Zircaloy-2 | 1 hr at 500° C. | 160 | 100 | 55 | — |

Further miscellaneous properties will be discussed with reference to the drawings.

Figure 5:
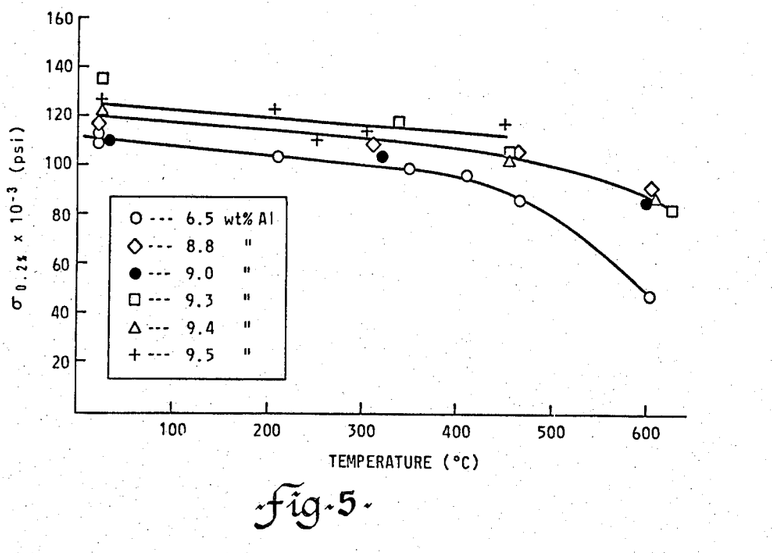
FIG. 5 is a graph showing the effect of temperature on the yield stress (at 0.2% strain offset) of zirconium alloys and is located on the sheet containing FIG. 3.

FIG. 5 shows the effects of temperature on yield stress ($\sigma_{0.2\%}$) of the hot worked and annealed alloys. Because of the proximity of the points separate curves were drawn only through the 6.5, the 9.5 and the collective 8.8–9.4 wt% Al points. For all compositions tested $\sigma_{0.2\%}$ decreases with increasing temperature. Two regions, however, are apparent, a low temperature region from 20° C. to ~450° C. in which the temperature effect is rather small, and a high temperature region from ~450° C. to 600° C. in which the effect is more pronounced. For instance $\sigma_{0.2\%}$ (6.5 wt% Al) decreases by ~20% over the first region, and by a further 50% over the second. Similarly, $\sigma_{0.2\%}$ (8.8 and 9.3 wt% Al) decreases by 10–20% over the first region, and by an equivalent amount over the second. However, the data in Table 3b shows that 8.5 and 9.0 wt% Al alloys in the fully annealed condition have similar values of $\sigma_{0.2\%}$ at 400° and 600° C.

Figure 6:
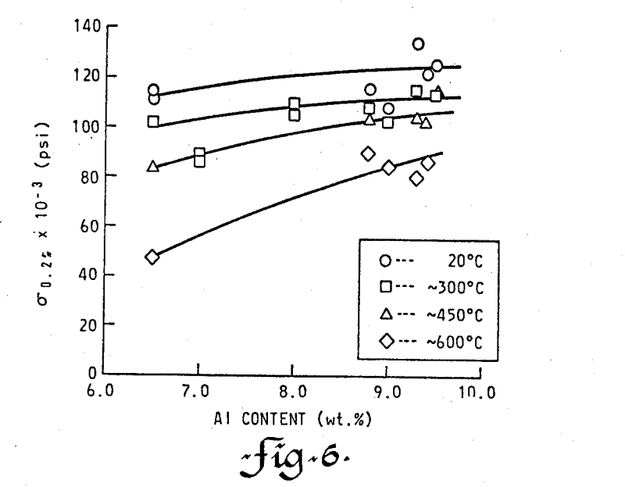
FIG. 6 is a graph showing the effect of Al content on the yield stress for zirconium alloys between 20° C. and 600° C.

FIG. 6 shows the effects of composition on $\sigma_{0.2\%}$ for the hot worked and annealed alloys. At all test temperatures $\sigma_{0.2\%}$ of the hot worked alloys increases with increasing Al content. The effect, however, is rather small. For example, in the low temperature region $\sigma_{0.2\%}$ increases by ~20% over the composition range tested, and in the high temperature range, by ~30%. However, at 400° C. the fully annealed alloys was found to have a drop in $\sigma_{0.2\%}$ at compositions between 8.5 and 9.5 wt% Al.

Figure 7:
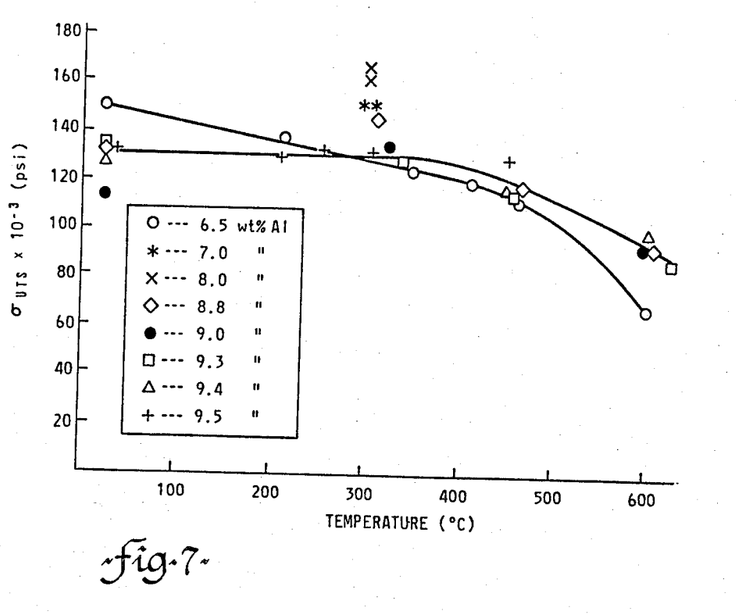
FIG. 7 is a graph showing the effect of temperature of the ultimate tensile stress of zirconium alloys.

FIG. 7 shows the effects of temperature on $\sigma_{UTS}$ for the hot worked alloys. Again two regions are apparent, analogous to the yield stress behaviour. The variation within each region, however, appears to differ for the hypostoichiometric and the hyperstoichiometric alloys. In the low temperature region (i.e. $\lesssim 450°$ C.), $\sigma_{UTS}$ (6.5 wt% Al) decreases with increasing temperature by ~25%, and in the second region by a further ~50%. For the hyperstoichiometric alloys on the other hand, $\sigma_{UTS}$ appears to be relatively independent of temperature over the first region, but decreases by ~30% over the second region. Also, $\sigma_{UTS}$ for these alloys appears to be independent of Al content, being generally within the range 125–135,000 psi over the first region.

While the effect of temperatures on the 7.0 and 8.0 wt% Al alloys is not defined, the results at 300° C. clearly indicate that $\sigma_{UTS}$ is considerably higher in these cases than it is for both the 6.5 wt% Al alloy and the hyperstoichiometric alloys.

EXAMPLE 16—Hot Working of Alloys

Cast alloys produced in Example 1 were rolled at temperatures up to 1100° C. At 500° C., cracks formed after ~5% reduction in thickness, but the alloys could be reduced in thickness by about 50% (10% per mass) at which point failure occurred suddenly. At 700° C., cracks again formed during the first few percent reduction. In this case, the alloys were reduced in thickness by more than 50% without disintegrating. Further reductions were not attempted. At temperatures above 1000° C., however, no cracks formed and the cast alloys rolled very easily. Reductions in area of at leat 25% per pass at strain rates of at least 40 sec$^{-1}$ were achieved with no difficulty. Edge cracking was not detected. Following working, metallographic and X-ray examinations revealed that the structure still consisted of Zr(Al) and Zr$_2$Al mainly. This transformed to Zr$_3$Al by annealing at 875° C., for less than 24 hours.

In a second series of experiments, the cast alloys were transformed as in Example 3 to produce a Zr$_3$Al matrix, and then rolled. It was observed that the transformed alloy cracked during rolling at temperatures below about 950° C. Above about 1000° C. however, the alloys could be worked. Reductions in thickness of 10% per pass were easily achieved and strip material 0.080" thick was produced from slabs initially 0.5" thick; i.e. reductions of 85% were possible without reaching the malleability limit.

All working was carried out in a protective enviroment of argon to minimize metal loss due to oxidation.

In a further series of experiments, samples from cast zirconium aluminum alloy ingots weighing 50 kg containing 7.6 wt%, 8.6 wt% and 9.0 wt% Al, were rolled following heat soaking, in the BZr-Zr$_2$ Al two phase region at temperatures of approximately 502° C., 702° C., 902° C., 1002° C., 1052° C. and 1102° C. The two phase $\beta$-Zr+Zr$_2$ Al ingots cracked after less than a few percent reduction in thickness when heated to about 502° C., 702° C. and 902° C. However, when heat soaked at about 1000° C., 1050° C. and 1100° C. the material rolled easily. At about 1050° C., for example, thickness was reduced by more than 90%, without edge cracking, indicating that the limit of malleability had not been reached. Following rolling, the alloy samples which had been heat soaked at about 1000° C., 1050° C. and 1100° C. were annealed at temperatures below about 992° C. for a time sufficient to transform the alloys to the desired Zr$_3$Al matrix.

EXAMPLE 17—Hot Working of Alloys by Extrusion

Zirconium-aluminum alloys, in the BZr-Zr$_2$ Al two phase region were extruded following heat soaking to form tubes.

Table 10 sets forth basic extrusion particulars, while Table 11 sets forth extrusion results.

TABLE 10

SUMMARY OF MATERIALS AND EXPERIMENTAL CONDITIONS FOR EXTRUSION OF Zr-Al TUBES

| Alloy | Metallurgical Condition | Experimental Conditions | | | | | | | |
|---|---|---|---|---|---|---|---|---|---|
| | Ingot Material: (≈50% Zr$_2$Al particles of 3 to 4 μm dia. in transformed β-Zr matrix). | Tube Size | | Thickness of cladding (cm) | Lubricant Base** | Tool Die | Materials** Mandrel | Extrusion Ratio | Average Strain Rate* (sec$^{-1}$) | Soak Temp (°C.) -1 hr. |
| Zr, 7.6 wt., % Al (Type A & B) | | Type | Dimensions (cm) | | | | | | | |
| Zr, 9.0 wt. % Al (Type A) | Ingot material: (≈60% Zr$_2$Al particles of 3 to 4 μm dia. in transformed β-Zr matrix). | A | 1.87 I.D. 4.24 O.D. | 0.09 | Cu and Pb Graphite | Atlas Seneca ® Atlas ® | Atlas Spartan ® Atlas ® | 4.8:1 | 7 | 1102 or 1152 |
| | | B | 3.50 I.D. 6.97 O.D. | 0.64 (outer) 0.32 (inner) | | Red Indian ® | Red Indian ® | 16:1 | 1 | 1152 |

*The average strain rate is defined as the total strain divided by the time required for a unit volume of material to flow through the die. Billets A were extruded through a die in which the semi-angle decreased with distance so that the strain rate was approximately constant. The semi-angle of the die used for billet B was 45° which gave an increasing strain rate during extrusion.

**Tools and lubricants were chosen on the basis of availability. While adequate, they do not necessarily represent the best choice for high temperature extrusion.

TABLE 11
SUMMARY OF EXTRUSION RESULTS FOR Zr-Al TUBES EXTRUDED IN β-Zr-Zr₂Al TWO PHASE REGION

| Tube | Alloys | Billet | Pre-Heat Temperature (°C.) | Breakthrough Pressure P (MN/m²) | Steady State Pressure (MN/m²) | Extrusion Constant* (MN/m²) k |
|---|---|---|---|---|---|---|
| 1 | Zr, 7.6 wt. % Al | A | 1102 | 624 | 575 | 500 |
| 2 | Zr, 7.6 wt. % Al | B | 1152 | 793 | — | 286 |
| 3 | Zr, 9.0 wt. % Al | A | 1152 | 505 | 452 | 322 |

*k was computed from the expression p=klnR where R is the extrusion ratio. It was assumed that the steel cladding had the same flow stress as the alloy.

In each case the tube extruded without difficulty, was straight and of reasonably uniform wall thickness.

The microstructures of tubes 1 and 2 of Table 11 were examined optically following surface preparation using the attack polishing/color etching technique (J. R. F. Ambler, E. M. Schulson and G. P. Kiely, J. Nucl. Mat., 50 (1974) 107). Transverse sections of tubes 1 and 2 revealed a relatively uniform $Zr_2Al$ particle size, of approximately 3–4 μm in average diameter. This feature was also evident from longitudinal sections, which also showed the $Zr_2Al$ particles reoriented in the direction of extrusion. Further, it appears that plastic flow during extrusion occurred mainly within the βZr matrix, the $Zr_2Al$ phase acting as an obstacle to flow. Possibly dynamic recovery and recrystallization of Bzr are important softening processes.

Transformation, subsequent to extrusion, from the βZr-$Zr_2Al$ two phase region to the $Zr_3Al$ matrix was essentially complete in about 4 hours at an annealing temperature of about 877° C., in alloys containing $Zr_2Al$ particles averaging 3–4 μm in diameter.

An important conclusion to be drawn from the Examples is that temperature is an extremely important variable in determining the workability of the zirconium alloys. Temperatures above about 1000° C. are recommended in order to avoid cracking. Another important conclusion is that the alloys need not be transformed to $Zr_3Al$ before working. They can be worked in the as-cast condition (at the temperatures mentioned above) and then subsequently transformed to $Zr_3Al$ by annealing at temperatures below 992° C., and more preferably below 975° C.

The principle difficulty experienced with working, in the case of either rolling or extruding, arises through excessive heat loss before or during working. Steps which can be taken to avoid undesirable alloy chilling include the provision of heat shields, heat soaking at somewhat higher temperatures than the subsequent working temperature—but of course below the alloy melting temperature, by preheating of working tools, and the like.

EXAMPLE 18—Comparative Irradiated and Unirradiated Tensile Properties

Specimens of a Zr-Al alloy containing 8.6 wt% Al were machined from the transverse direction of a slab forged and rolled at ≃1127° C. The specimens were annealed at 887° C. for 16 hours to effect the peritectoid transformation $Zr+Zr_2Al \rightarrow Zr_3Al$, stress relieved 15 hours at 700° C. and then furnace cooled. The specimens generally contain about 8–20% by volume Zr, about 0–12% by volume $Zr_2Al$, about 74–86% by volume $Zr_3Al$ and a grain size, of the $Zr_3Al$ matrix, of approximately 5 μm.

Irradiated and unirradiated tensile properties, as well as the thermal neutron absorption cross section, of the $Zr_3Al$ specimens described above were compared, at ≃300° C., to those of the Zr-2.5 wt% Nb and Zircalloy-2 alloys presently used for structural components in "CANDU" thermal nuclear reactors. The comparative results are shown in the following table.

TABLE 12

| Alloy | Fluence n/m² | 0.2% Yield Stress, MPa | Ultimate Tensile Strength, MPa | Elongation, % | Thermal Neutron Absorption Cross section, m²/m³ |
|---|---|---|---|---|---|
| $Zr_3Al$ | 0 | 425 ± 8 | 730 ± 40 | 8 ± 2 | 0.96 |
| $Zr_3Al$ | 2.6 × 10²⁴ | 676 ± 5 | 845 ± 10 | 13 ± 1 | |
| Zr-2.5Nb longitudinal pressure tubing | 0 | 447 | 559 | 6 | 0.91 |
| Zr-2.5Nb longitudinal pressure tubing | 0.7 × 10²⁴ | 695 | 772 | 4.5 | |
| Zircaloy-2 longitudinal pressure tubing | 0 | 333 | 369 | 12 | 0.87 |
| Zircaloy-2 longitudinal pressure tubing | 5.3 × 10²⁴ | 445 | 446 | 4 | |

It may be noted from the results that the superior tensile strength of $Zr_3Al$ relative to Zr-2.5 wt% Nb and Zircalloy-2 is maintained after irradiation, although long term irradiation effects are not yet known.

EXAMPLE 19—Notch-Sensitivity and Irradiation Effect on Notch-Sensitivity

Round tensile specimens of a Zr-Al alloy containing 8.9 wt% Al, prepared from crystal bar zirconium and aluminum of purity >99.999% by non-consumable arc melting, were prepared to ASTM specifications E-8-65T. The specimens had a diameter, $\phi_0$, of 2.28 mm and a gauge length, $l_0$ of 12.7 mm. The specimens were annealed at 887° C. at 2.6×10⁻⁴ Pa to effect the peritectoid transformation $Zr+Zr_2Al \rightarrow Zr_3Al$, for times ranging from 3 to 1000 hours to produce a variety of $Zr_3Al$ grain sizes. To obtain reliable ultimate tensile strength, UTS, data for unnotched specimens, and hence meaningful notch-sensitivity ratios, NSR's, care was taken to ensure that the specimen surfaces were strainfree and smooth. Thus, the specimens were machined prior to the 887° C. transformation and electrochemically polished afterwards to remove 0.1/mm from the diameter. To obtain ultimate tensile strength (notched), $UTS^N$ data, specimens were notched after the 887° C. transformation and then either tested without further annealing (giving UTS$_f^N$ and NSR$_f$ results) or annealed 1 h at 887° C. (giving UTS$_a^N$ and NSR$_a$ results). The UTS$_f^N$ measurements are thought to better reflect the actual tensile strength of a component which has been unintentionally notched (scratched, gouged, etc.) whereas the UTS$_a^N$ data better indicate the tensile strength of Zr$_3$Al containing only a geometrical notch without an associated plastic strain field beneath. The notched specimens were circumferentially notched such that the net cross-sectional area at the notch was one-half the prior cross-sectional area. The notch angle was 60° and the root radius, 0.05 to 0.06 mm.

Experiments with unirradiated notched specimens established that Zr$_3$Al is inherently notch sensitive, at least at temperatures ranging from room temperature to about 450° C. The notch-sensitivity ratio, NSR, increased from ≃0.7 at temperatures ≦160° C. to ≃0.9 at temperatures ≳300° C. Variations in the grain size of the Zr$_3$Al proved to have negligible effect on notch-sensitivity.

To assess at least short term irradiation effects, some of the notched and unnotched specimens were irradiated to $1.4 \times 10^{24}$ n/m$^2$ (E>1 MeV) in a fast neutron flux of $2 \times 10^{17}$ n/m$^2$·s in pressurized water at ≃300° C.

Table 13 summarizes the irradiated tensile properties of the Zr$_3$Al specimens at room temperature. Compared to the results for the unirradiated counterparts, a fast neutron fluence of $1.4 \times 10^{24}$ n/m$^2$ proved to have little effect on the ultimate tensile strength, at least for material with an average grain size within the range 3.5 to 19 μm. The principal effects proved to be an increase in yield strengths and an increase in notched tensile strength. Correspondingly, irradiation increased the NSR. Indeed, the results show that the NSR>1, implying that, when irradiated, Zr$_3$Al is strengthened by a notch. This result contrasted with unirradiated material and suggests that fast neutron irradiation improves the toughness of Zr$_3$Al-based alloys, at least after low doses.

TABLE 13

Irradiated tensile properties at room temperature for Zr$_3$Al (Zr 8.9% Al) versus grain size ($1.4 \times 10^{24}$ n/m$^2$ (E > 1 MeV)

| Grain Size (μm) | $\sigma_{0.2\%}$ (MPa) | UTS (MPa) | UST$_a^N$ (MPa) | NSR$_9$ |
|---|---|---|---|---|
| 3.5 | 672 | 1086 | 1153 | 1.05 ± 0.02 |
|  | 700 | 1117 |  |  |
| 8.3 | 565 | 1085 | 1128 | 1.04 |
| 19 | 527 | 1031 | 1150 | 1.11 ± 0.01 |
|  | 532 | 1047 |  |  |

It will be appreciated that, while this specification is directed primarily to binary Zr-Al alloys, one or more other alloying elements may be introduced into the alloys provided always that the esential Zr$_3$Al structure is maintained. For example, one or more of the elements, magnesium, tin, chromium, iron, carbon, silicon, yttrium, niobium, molybdenum and beryllium in amounts up to about 3 wt% would be expected to improve strength in creep and/or resistance to corrosion, and furthermore, to enhance the rate of formation of Zr$_3$Al. It will be further appreciated that such additional alloying elements may have some effect upon the amount of Al necessary in the alloy to provide the required Zr$_3$Al structure, and for this reason the range of Al present may be above or below that preferred for the binary alloys.

We claim:

1. A heat-treated, high tensile strength creep and corrosion resistant zirconium alloy containing 7.0–10.0 wt% aluminum, and 0–3.0 wt% of one or more elements selected from the group comprising magnesium, tin, chromium, iron, carbon, silicon, yttrium, niobium, molybdenum and beryllium, balance, zirconium and incidental impurities, having a substantially continuous matrix of the intermetallic compound Zr$_3$Al.

2. An alloy as claimed in claim 1 contining 7.5–9.5 wt% aluminum, balance zirconium and incidental impurities.

3. An alloy as claimed in claim 1 wherein said Zr$_3$Al is a continuous matrix, containing at most isolated regions of αZr and Zr$_2$Al.

4. An alloy as claimed in claim 1, containing less than 20 vol. % of an αZr solid solution phase.

5. An alloy as claimed in claim 1, having an ultimate tensile strength in the range between about 130,000 and 165,000 psi at 300° C.

6. A corrosion resistant alloy as claimed in claim 1, having a rate of weight gain of less than 0.2 mg/dm$^2$/day during exposure to moist air at 300° C.

7. An alloy as claimed in claim 1 having a thermal neutron absorption cross section of about 0.0096 cm$^2$/cm$^3$.

8. An alloy as claimed in claim 5 having an increased ultimate tensile strength when irradiated by a fast neutron fluence.

9. An alloy as claimed in claim 1 which, unirradiated, is notch-sensitive.

10. An alloy as claimed in claim 9 which, irradiated by a fast neutron fluence, is notch-strengthened.

11. A corrosion resistant, structural element fabricated from an alloy containing 7.0–10.0 wt% Al, and 0–3.0 wt% of one or more elements selected from the group comprising magnesium, tin, chromium, iron, carbon, silicon, yttrium, niobium, molybdenum and beryllium, balance zirconium and incidental impurities, heat treated in the range from 700° C.–950° C. for a sufficient time to ensure a substantially continuous matrix of the intermetallic compound Zr$_3$Al.

12. A structural element as claimed in claim 11 containing 7.5–9.5 wt% Al balance zirconium and incidental impurities.

13. A structural element as claimed in claim 12 for use in a thermal nuclear reactor and selected from the group comprising pressure tubes, fuel sheaths and central support tubes.

14. A structural element as claimed in claim 13 having a thermal neutron absorption cross section of about 0.0096 cm$^2$/cm$^3$.

* * * * *